US008857730B2

(12) United States Patent
Hartfelder et al.

(10) Patent No.: US 8,857,730 B2
(45) Date of Patent: *Oct. 14, 2014

(54) SUMP SPRINKLER CONTROL SYSTEM

(75) Inventors: David Hartfelder, Orchard Lake, MI (US); Andrea Hartfelder, Orchard Lake, MI (US)

(73) Assignee: M.E.C. Systems, Orchard Lake, MI (US)

(*) Notice: Subject to any disclaimer, the term of this patent is extended or adjusted under 35 U.S.C. 154(b) by 246 days.

This patent is subject to a terminal disclaimer.

(21) Appl. No.: 13/490,811

(22) Filed: Jun. 7, 2012

(65) Prior Publication Data

US 2012/0325923 A1    Dec. 27, 2012

(51) Int. Cl.
*B05B 17/00* (2006.01)
*B05B 3/00* (2006.01)
*A01G 25/16* (2006.01)

(52) U.S. Cl.
CPC .................................. *A01G 25/16* (2013.01)
USPC ........ 239/1; 239/63; 239/65; 239/69; 239/70; 239/74; 239/200; 239/208; 239/565; 137/236.1; 405/36; 405/53

(58) Field of Classification Search
USPC ............. 239/63–65, 69, 70, 71, 74, 200, 208, 239/565, 1; 137/236.1, 565.01; 405/36, 53
See application file for complete search history.

(56) References Cited

U.S. PATENT DOCUMENTS

| 4,541,446 | A | * | 9/1985 | Hogan | 239/65 |
|---|---|---|---|---|---|
| 4,708,162 | A | | 11/1987 | Bayat | |
| 5,106,493 | A | | 4/1992 | McIntosh | |
| 5,168,586 | A | | 12/1992 | Small | |
| 5,207,380 | A | | 5/1993 | Harryman | |
| 6,132,138 | A | | 10/2000 | Haese | |
| 6,575,714 | B2 | | 6/2003 | Pace et al. | |
| 6,712,553 | B1 | | 3/2004 | Niedermeyer | |
| 6,994,271 | B2 | | 2/2006 | Tarara et al. | |
| 7,025,076 | B2 | * | 4/2006 | Zimmerman et al. | 405/53 |
| 7,066,197 | B1 | | 6/2006 | Gray et al. | |
| 7,207,748 | B1 | | 4/2007 | Urban | |
| 7,534,070 | B1 | | 5/2009 | Urban | |
| 7,614,192 | B2 | | 11/2009 | Safie | |
| 7,721,491 | B2 | | 5/2010 | Appel | |
| RE41,761 | E | | 9/2010 | Wiseman et al. | |
| 2011/0114748 | A1 | * | 5/2011 | Boyajian | 239/70 |
| 2013/0200171 | A1 | * | 8/2013 | Hartfelder et al. | 239/74 |

* cited by examiner

Primary Examiner — Steven J Ganey

(74) Attorney, Agent, or Firm — Raggio & Dinnin, P.C.

(57) ABSTRACT

A sump sprinkler system for use with residential and commercial buildings. The sump sprinkler system comprises a system controller and a sprinkler pump in communication with the system controller. The sump sprinkler system also comprises an intake tube connected to the sprinkler pump, wherein the intake having an end arranged in a sump of a building. The sump sprinkler system also comprises at least one sprinkler connected to the output of the sprinkler pump, wherein the sprinkler is in communication with the system controller. The sump sprinkler system also comprises a water level member in communication with the system controller, wherein the water level member is arranged in the sump.

21 Claims, 12 Drawing Sheets

SUMP SPRINKLER CONTROL SYSTEM

This application claims the benefit of provisional application 61/571,249 filed Jun. 23, 2011

BACKGROUND OF THE INVENTION

1. Field of the Invention

The present invention generally relates to sprinkler systems for home or commercial applications, and more particularly, relates to a sump sprinkler control system to irrigate and control irrigation of residential or commercial properties by using water from a buildings drainage and sump system.

2. Description of Related Art

Sprinkler systems and sprinkler control systems have been known for many years in the prior art. Most of these prior art sprinkler systems connect to a city water system that provide water to the home of residents where the sprinkler system is installed. The city supplied water is controlled by a sprinkler control system which distributes the water to a predetermined number of sprinkler stations to water the lawn and landscaping around the building. Generally, the user of prior art sprinkler systems has to pay for the cost of the city water and sewer system for use of the irrigation system at the household. Many of these households also have fertilizing costs associated with keeping the lawn in a pristine condition. The prior art sprinkler control systems also need to be blown out at the end of the season, such that water is not trapped within the system, which may freeze and harm or crack the pipes of the sprinkler system. Some of these prior art automatic sprinkler control systems also have attempted to collect rain water in large holding tanks for use in irrigating the lawn and landscaping around homes, however the high cost of installation of such systems may be prohibitive to use of such systems.

Many of the prior art sprinkler systems described above for irrigating landscaping and lawns of homes may be high cost systems that require a lot of maintenance and require a lot of out of pocket expenses via the use of city water and sewer systems to which the sprinkler system is connected. Therefore, there is a need in the art for a sump sprinkler system and associated control system that takes advantage of water from a buildings drainage and sump system in areas where the water table is high enough to provide sufficient volume. There also is a need in the art for a sump sprinkler control system that uses water that would otherwise be wasted and exhausted to the sewer or property drainage system to irrigate the lawn and flowerbeds of the property. There also is a need in the art for a sump sprinkler control system that provides a control unit that provides intuitive custom programmability and ease of use to the homeowner.

There also is a need in the art for a system that may incorporate a smart fill time learning algorithm that will automatically adjust for varying water table heights throughout the growing season. There also is a need in the art for a sump sprinkler control system that allows the system to start at a programmed time and complete the programmed watering cycle in an efficient manner.

There also is a need in the art for a sump sprinkler control system that uses green technologies and can save many hundreds of dollars per year over the cost of using a city water system and may also save up to 70% to 80% on yearly fertilizing costs because of the high nutrient content generally found in ground waters. Furthermore, there is a need in the art for a sump sprinkler control system that reduces the cost and hassle of scheduling year end sprinkler system blowouts when a compressor is built into a sump sprinkler control system as described in the present invention.

SUMMARY OF THE INVENTION

One object of the present invention may be to provide an improved sprinkler system.

Another object of the present invention may be to provide a sump sprinkler control system.

Still another object of the present invention may be to provide a sump sprinkler control system that is capable of controlling irrigation of residential or commercial property by using water from a drainage or sump system.

Yet a further object of the present invention may be to provide a sump sprinkler control system that includes a high pressure medium volume sprinkler pump in order to operate a plurality of sprinkler valve stations to irrigate a residence.

Still another object of the present invention may be to provide a sump sprinkler control system that includes an air compressor that can be controlled to blow out the plurality of sprinkler stations automatically.

Still another object of the present invention may be to provide a sump sprinkler control system that includes diagnostic programming that may provide operator warning and system shut down in the event of high or low sprinkler pump pressure and can use the sprinkler pump to exhaust water in case of sump pump failure and high sump water.

Still another object of the present invention may be to provide a sump sprinkler control system that uses a smart fill time learning algorithm, which automatically adjusts for varying water table heights throughout the growing season.

Still a further object of the present invention may be to provide a sump sprinkler control system that allows for watering to occur in as an efficient cycle as possible.

Still another object of the present invention may be to provide a sump sprinkler control system that may save hundreds of dollars per year over the cost of using a city water and sewer system for irrigation use.

Still another object of the present invention may be to provide a sump sprinkler control system that is capable of saving 70% to 80% on yearly fertilizing costs due to ground water typically having a higher nutrient content than city treated water.

According to the present invention, the foregoing and other objects and advantages are obtained by a novel design for a sump sprinkler control system. The sump sprinkler control system includes a system controller in communication with a sump pump arranged within a sump of a residential or commercial building. The system also includes a sprinkler pump in communication with the system controller. The sprinkler pump has a tube or pipe arranged on one end thereof while the other end extends into the sump of the building. The system allows for water to be removed from the sump through the sprinkler pump into an outlet tube for piping out to sprinkler stations arranged around the grounds of the residence. Attached to the inlet tube of the sprinkler pump is a water level device that is capable of detecting a minimum of three water levels. The water level device is also in communication with the system controller. The sump sprinkler control system also may include an air compressor in communication with the system controller and in communication with the outlet piping and the sprinkler stations. The sump sprinkler control system may also include back flow prevention valves arranged between the air compressor and the outlet tube and the outlet tube and the sprinkler pump. The system may include a smart fill time learning algorithm and associated diagnostic and scheduling algorithms to control operation of the sump sprinkler apparatus.

One advantage of the present invention may be that it provides an improved sprinkler system.

A further advantage of the present invention may be that it provides for a sump sprinkler apparatus and associated control system for use in residential and commercial buildings.

Still a further advantage of the present invention may be that it provides for a sump sprinkler control system that uses water from a residential or commercial drainage and sump system to irrigate lawn and flowerbeds of the residence or commercial property.

Yet a further advantage of the present invention may be that it provides for a sump sprinkler control system that has intuitive custom programmability and ease of use, such as that of current automatic sprinkler systems.

Still another advantage of the present invention may be that it provides for a sump sprinkler control system that is capable of controlling a high volume sump pump to accumulate water volume in a home foundation drainage system while also controlling a high pressure medium volume sprinkler pump and up to twelve sprinkler stations to irrigate the residence.

Still a further advantage of the present invention may be that it provides for an air compressor that can be controlled to blow out up to twelve sprinkler stations automatically.

Still another advantage of the present invention may be that it provides for diagnostic software that provides operator warning and system shut down in the event of high or low sprinkler pump pressure and can use the sprinkler pump to exhaust water in case of sump pump failure and high sump water.

Still a further advantage of the present invention may be that it provides a sump sprinkler control system that incorporates a smart fill time learning algorithm that may automatically adjust for varying water table heights throughout the growing season.

Yet another advantage of the present invention may be that it provides for a sump sprinkler control system that is capable of starting at programmed times and completing the water cycle in a manner as efficient as possible.

Still a further advantage of the present invention may be that it provides for a sump sprinkler control system that is low cost compared to existing automatic sprinkler systems fed off of municipal water systems.

Other objects, features and advantages of the present invention will become apparent from the subsequent description and appended claims, taken in conjunction with the accompanying drawings.

BRIEF DESCRIPTION OF THE EMBODIMENT(S)

Figure 1:
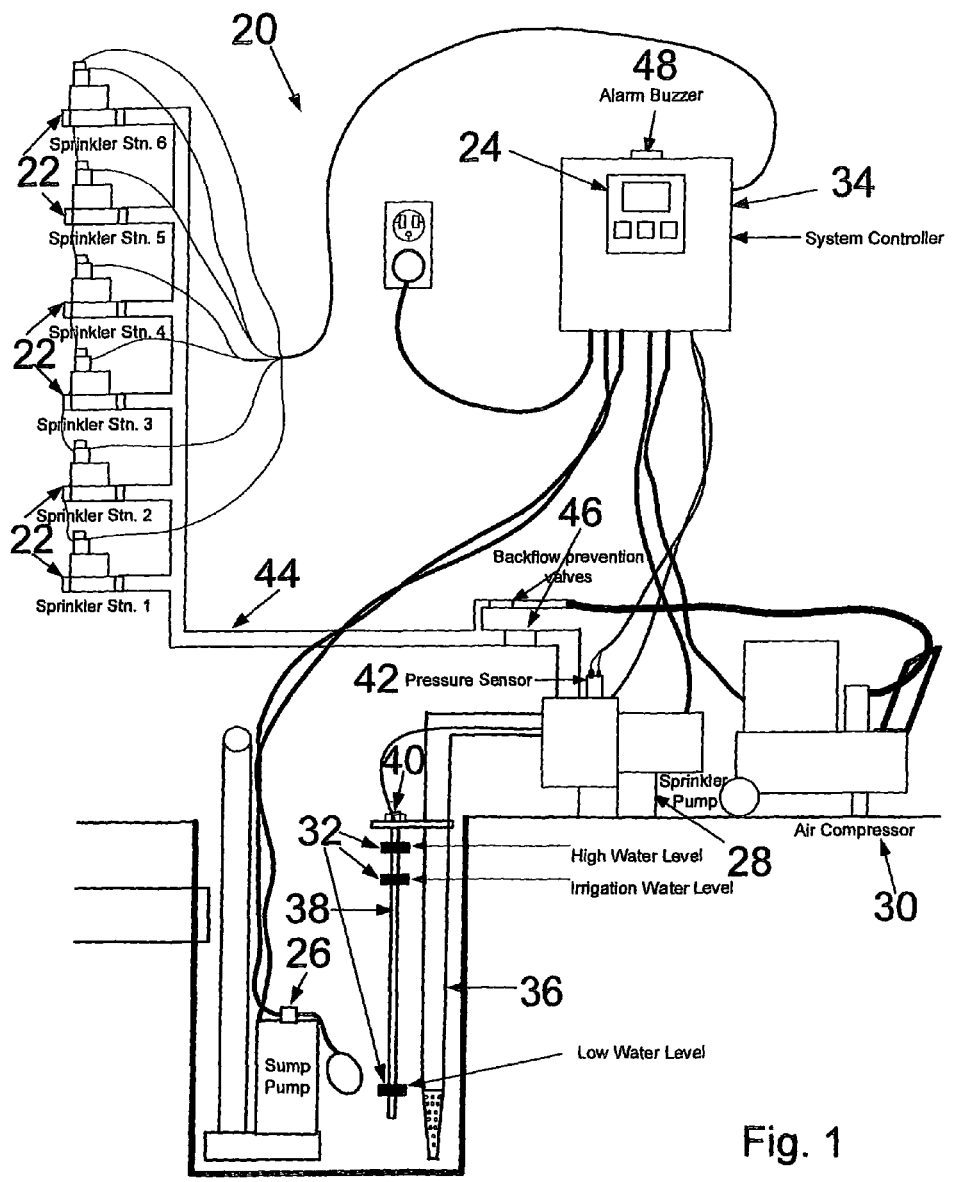
FIG. 1 shows a plan view of a sump sprinkler control system according to the present invention.
Figure 2:
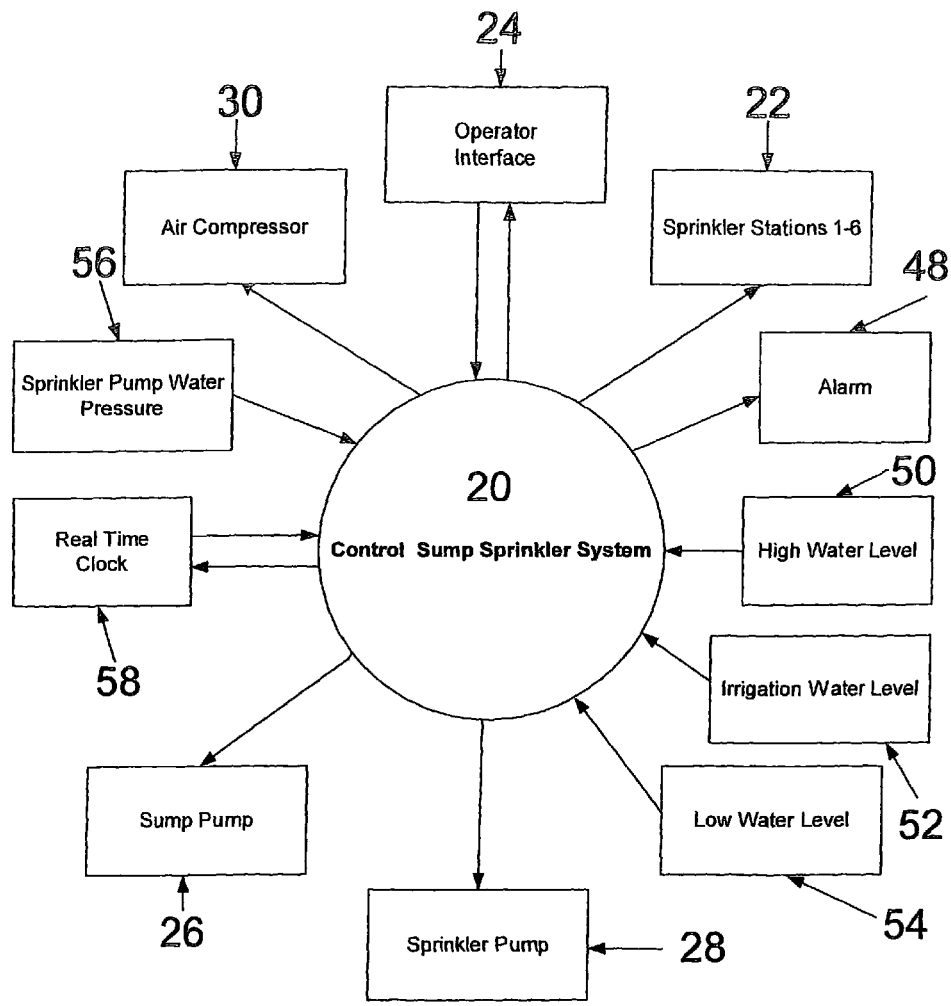
FIG. 2 shows a sump sprinkler controller block diagram.
Figure 3:
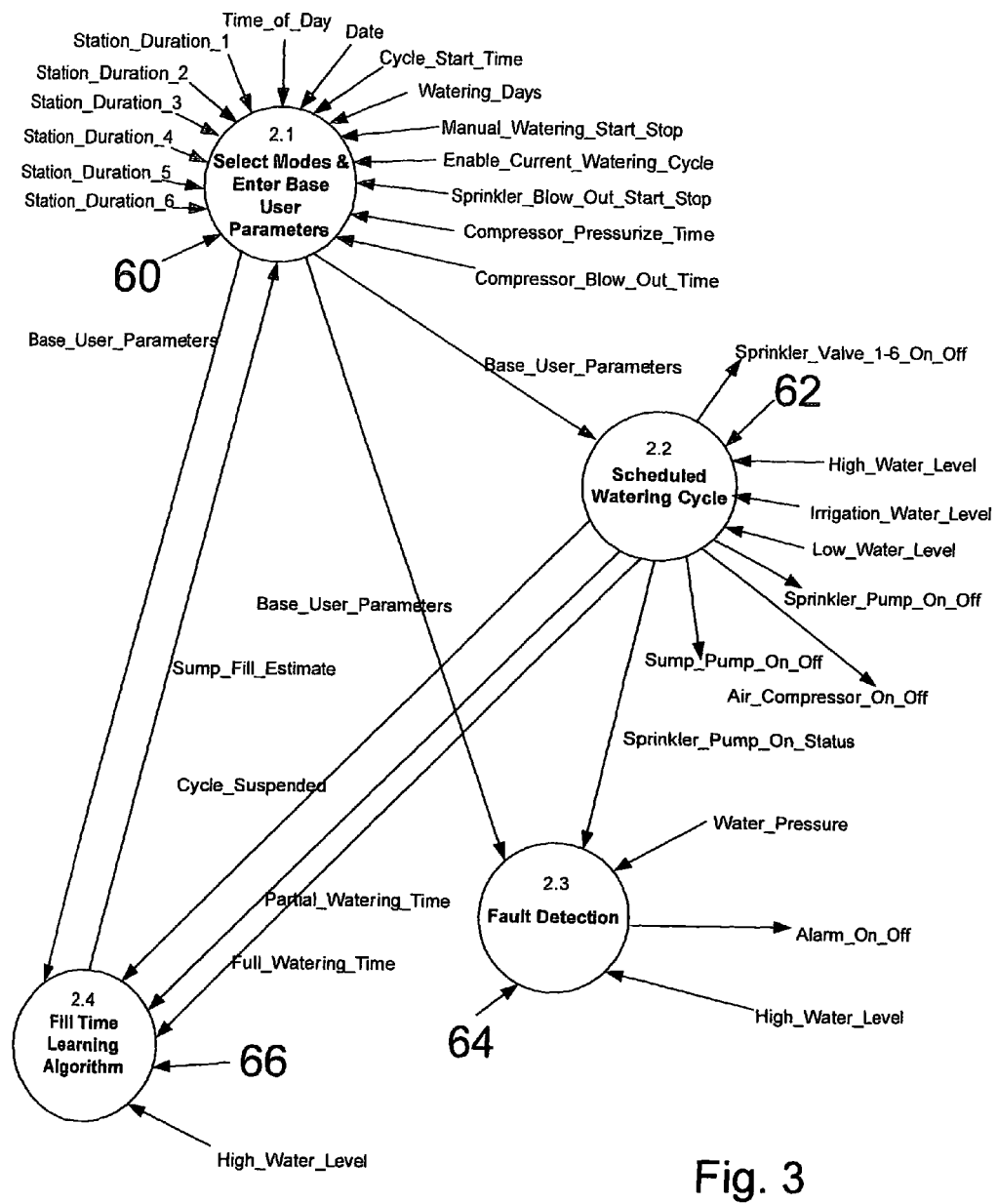
FIG. 3 shows a high level system model diagram according to the present invention.
Figure 4:
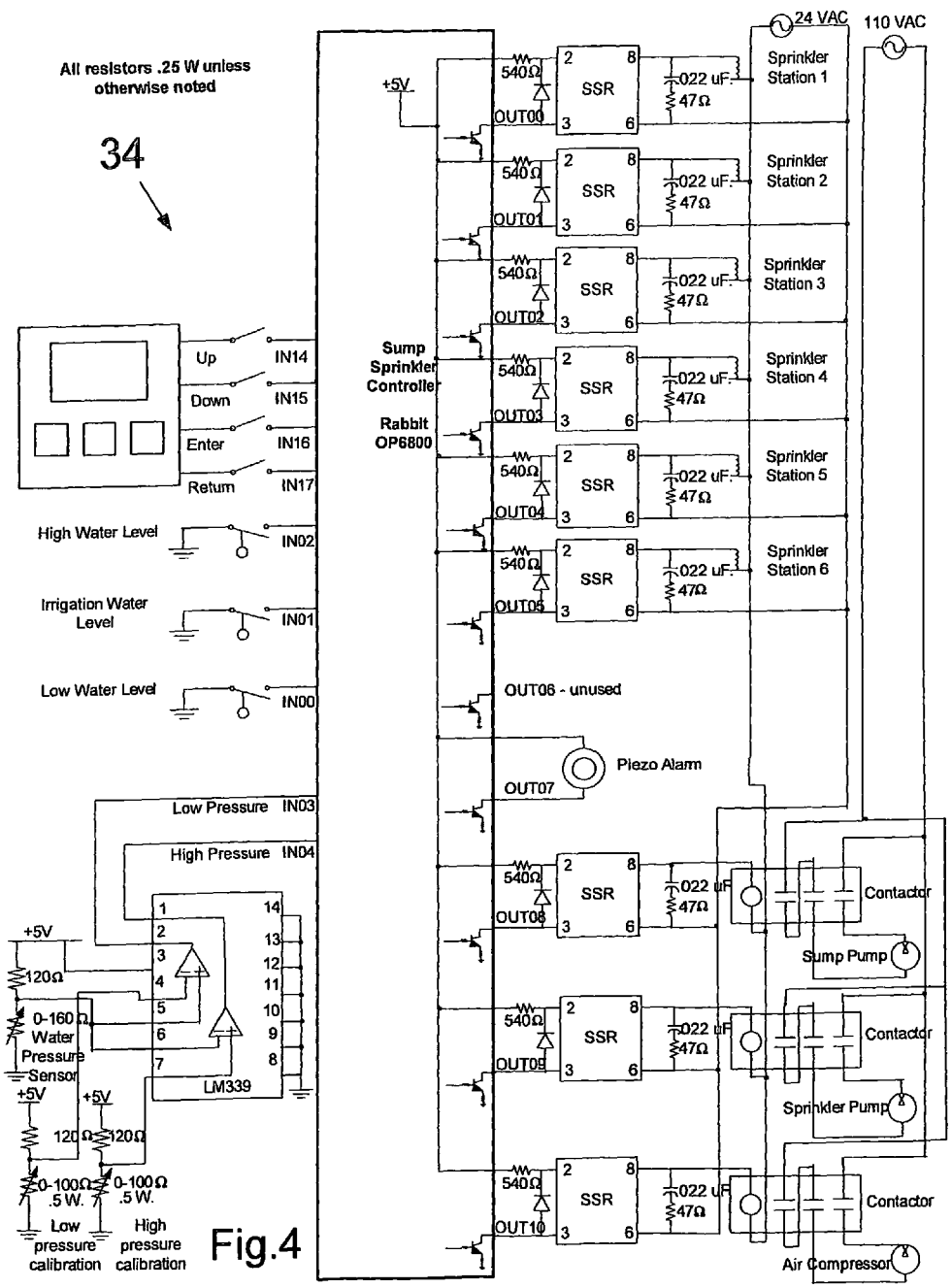
FIG. 4 shows a mechanization diagram of the sump sprinkler control system according to the present invention.
Figure 5:
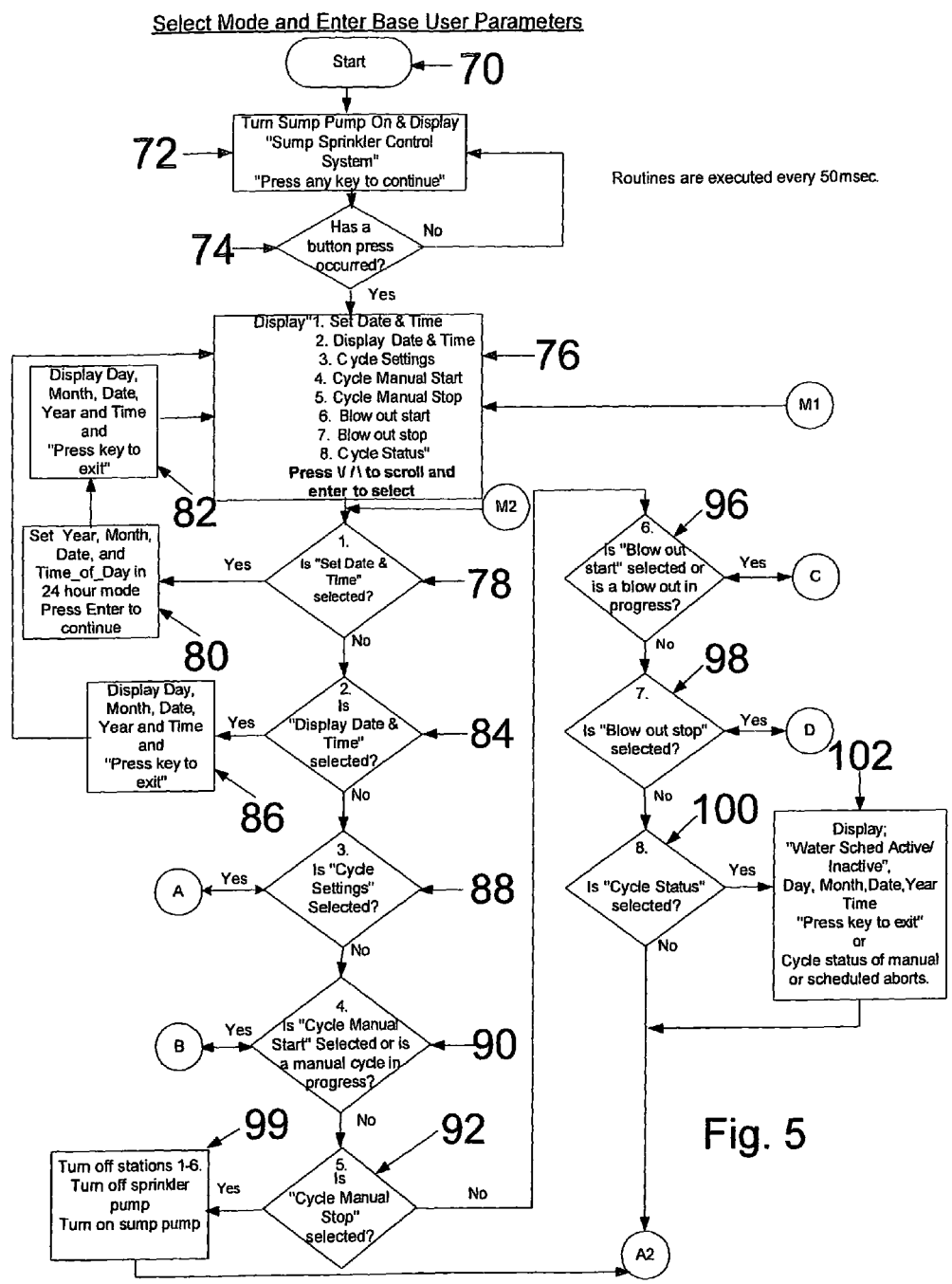
FIG. 5 shows a flow chart of a sump sprinkler control system according to the present invention.
Figure 6:
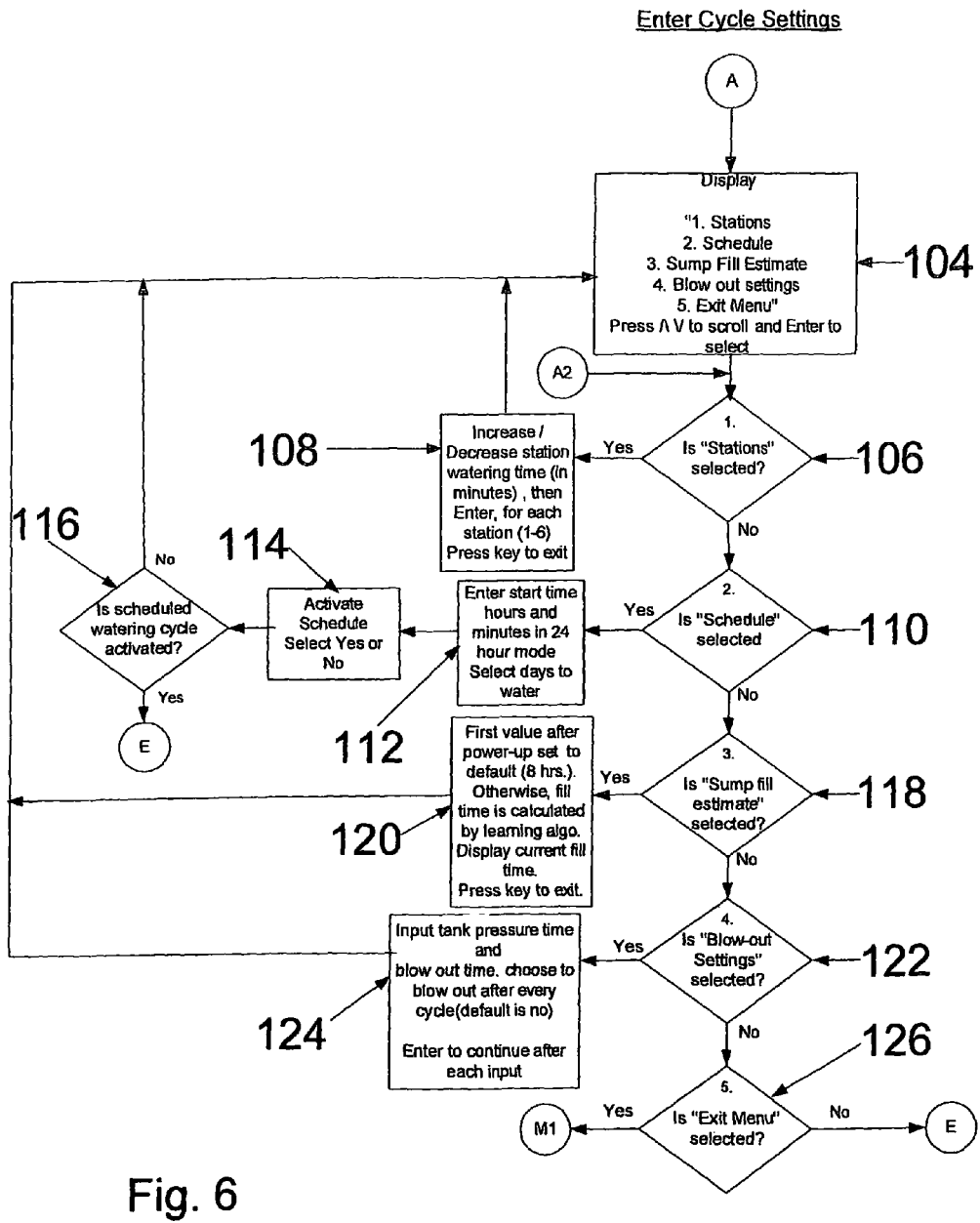
FIG. 6 shows a flow chart of a sump sprinkler control system according to the present invention.
Figure 7:
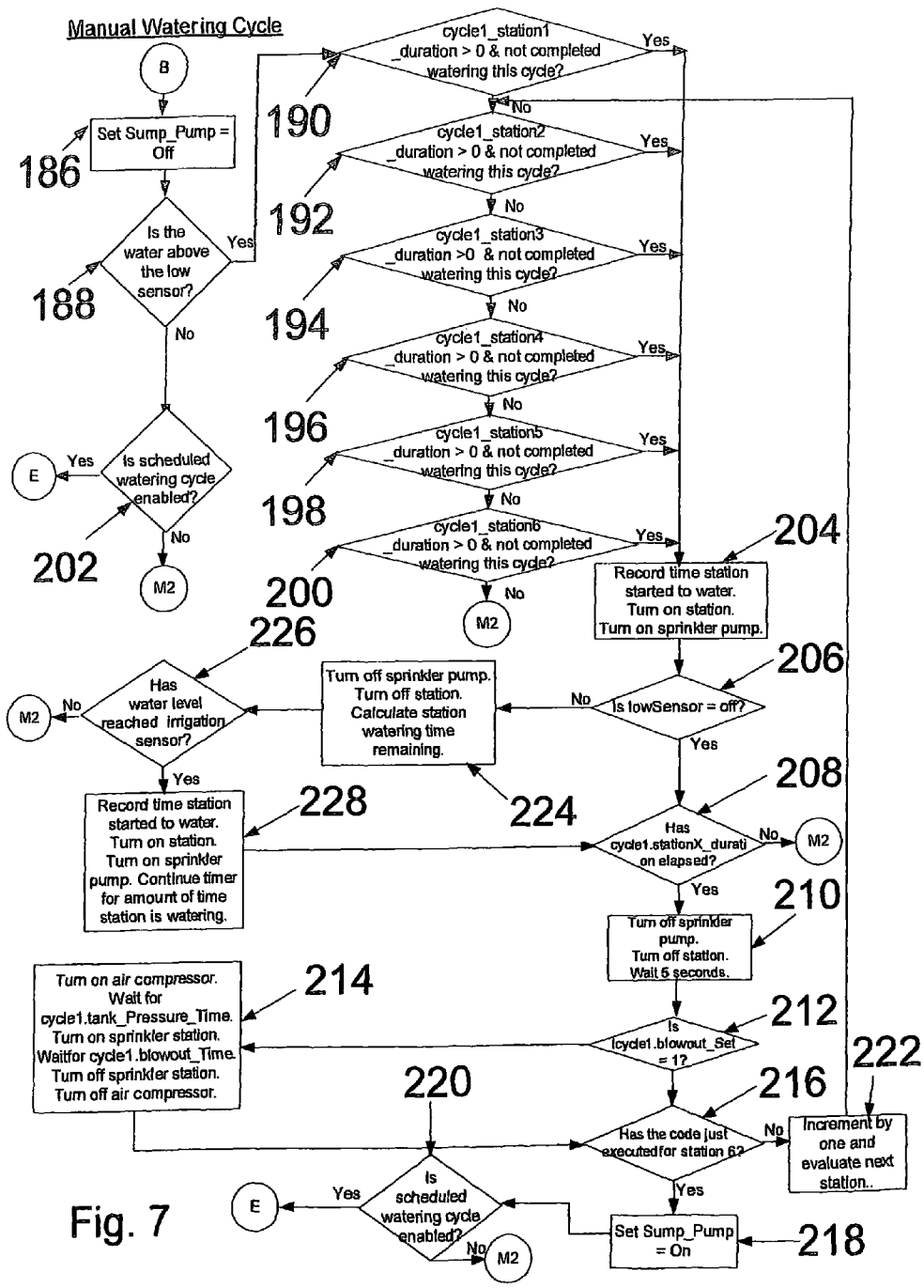
FIG. 7 shows a flow chart of a sump sprinkler control system according to the present invention.
Figure 8:
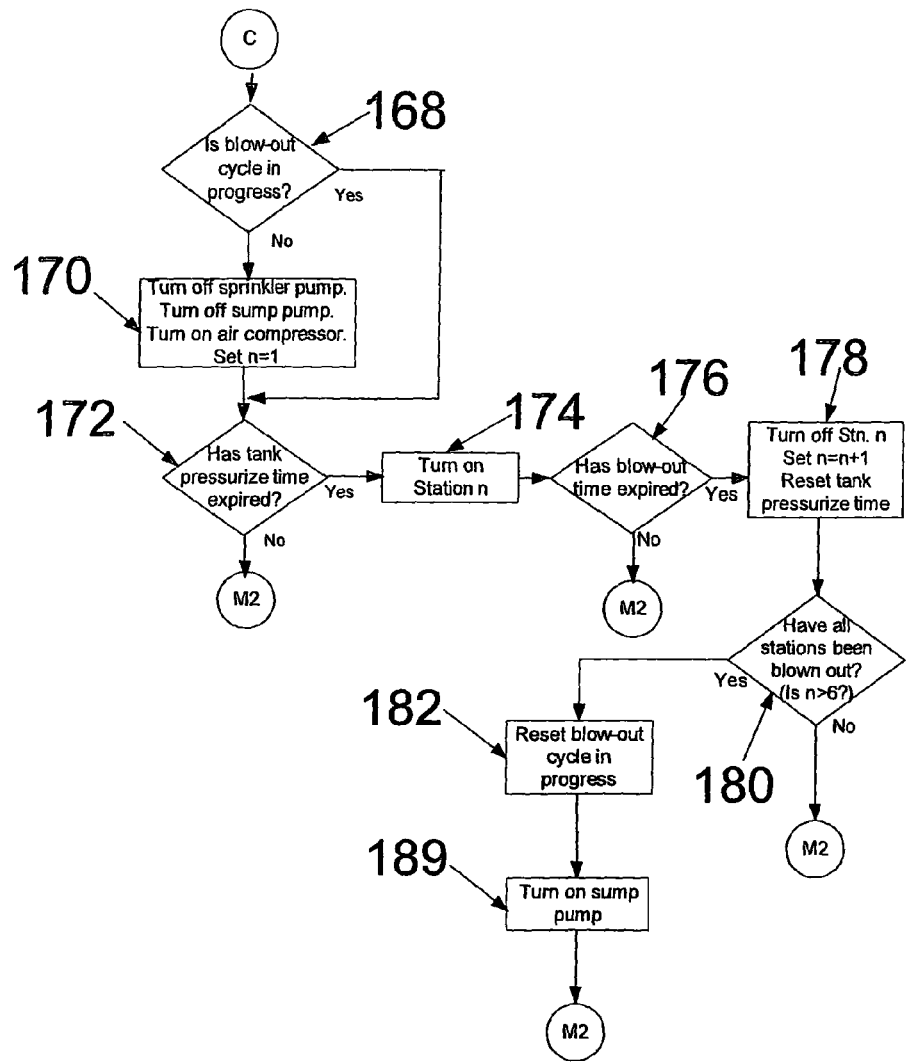
FIG. 8 shows a flow chart of a sump sprinkler control system according to the present invention.
Figure 9:
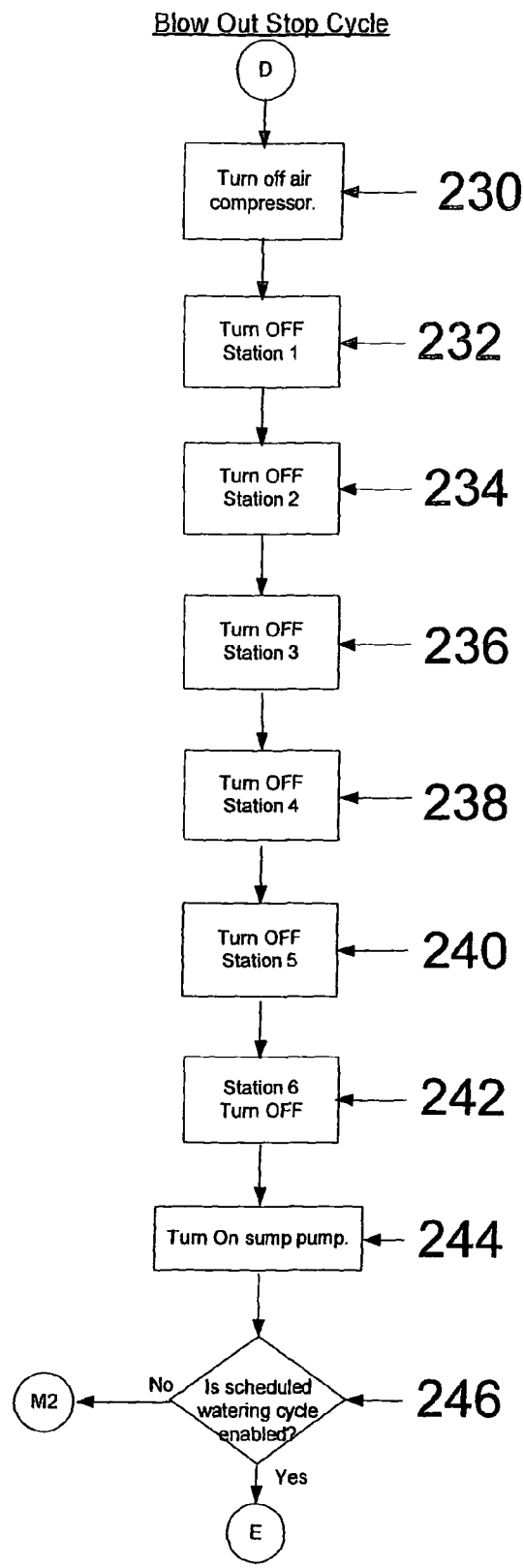
FIG. 9 shows a flow chart of a sump sprinkler control system according to the present invention.
Figure 10:
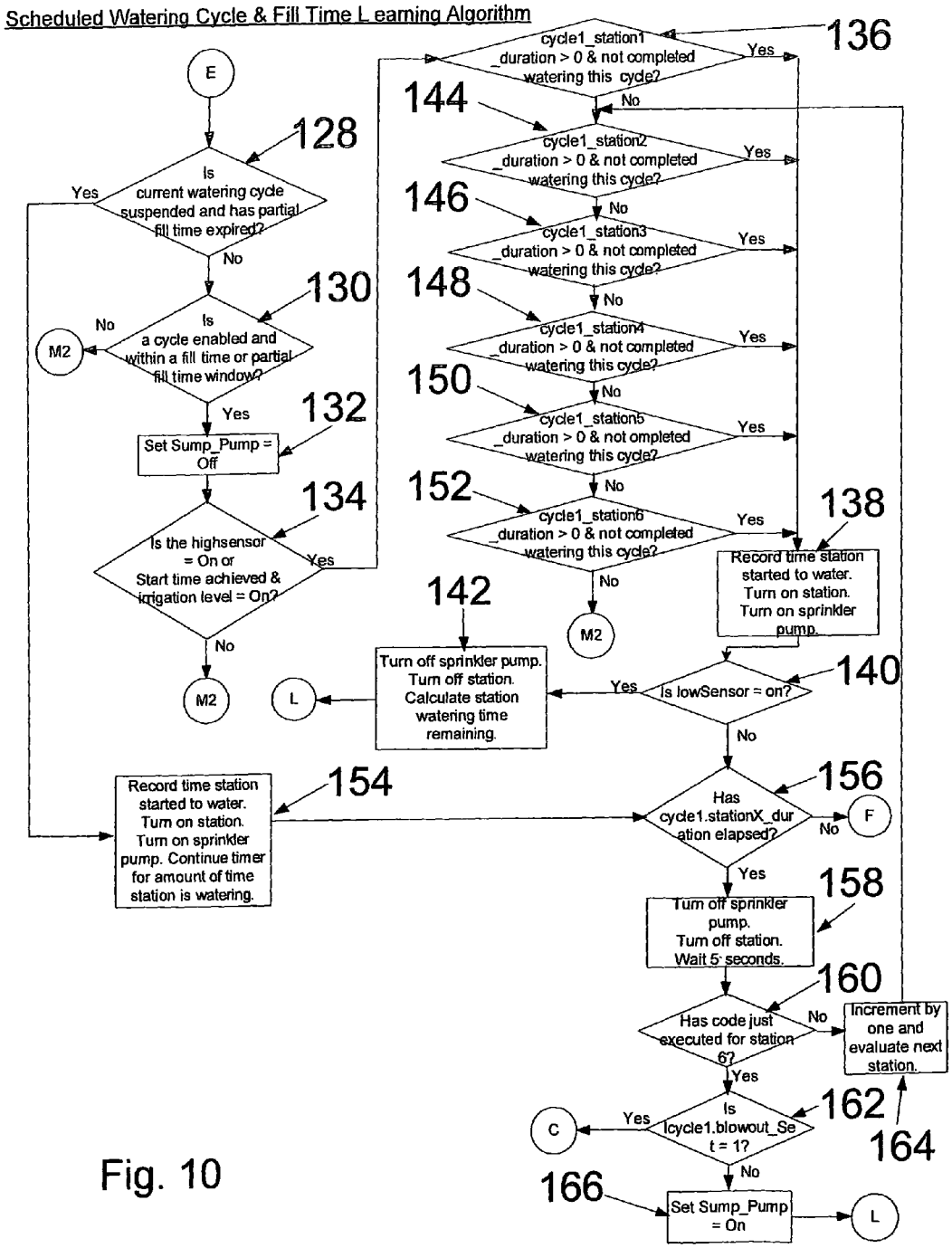
FIG. 10 shows a flow chart of a sump sprinkler control system according to the present invention.
Figure 11:
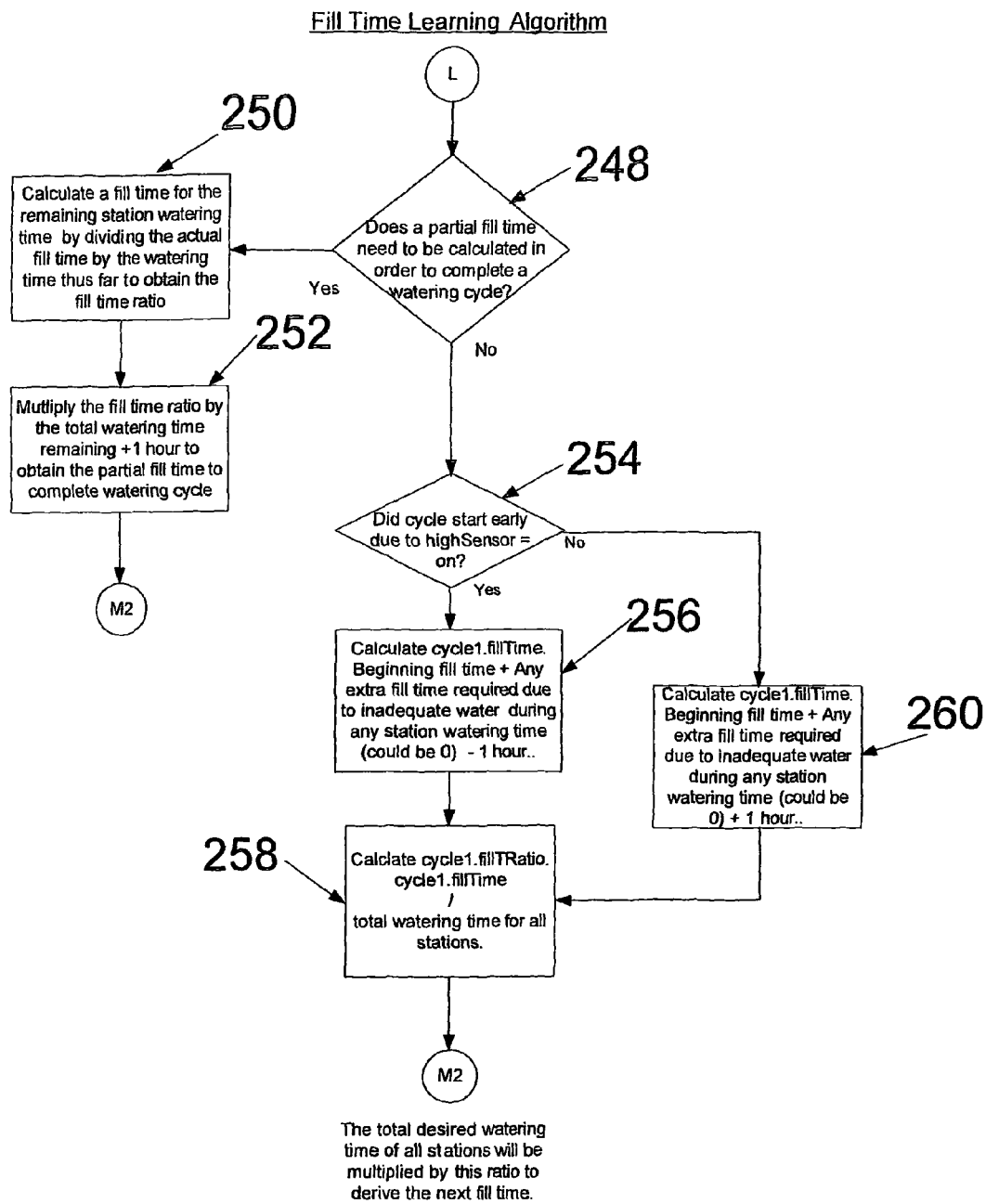
FIG. 11 shows a flow chart of a sump sprinkler control system according to the present invention.
Figure 12:
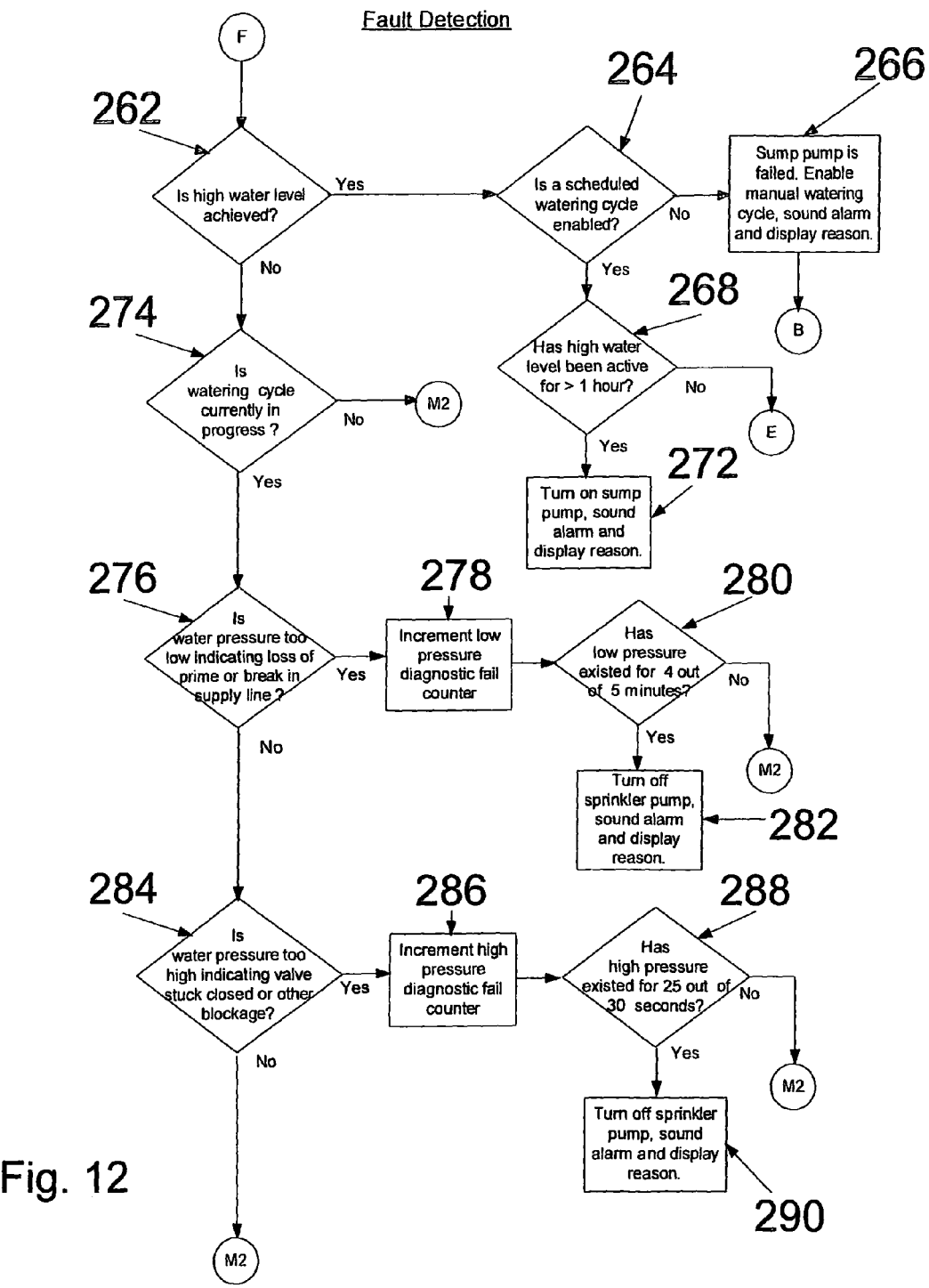
FIG. 12 shows a flow chart of a sump sprinkler control system according to the present invention.

Referring to the drawings, there is shown a sump sprinkler control system 20 according to an embodiment of the present invention. Generally, the present invention provides a sprinkler irrigation system for use in a residential or commercial property. The sump sprinkler control system 20 generally is used for irrigation of either a residential or commercial property by using water from the buildings drainage and sump system. The water that is used would otherwise be exhausted via a sewer or property drainage system, however with the use of the sump sprinkler control system 20 this water is used to irrigate the lawn and landscaping surrounding the residence or commercial buildings. In one contemplated embodiment the water will be passed through a manually moved sprinkler and hose set up as seen in many residential environments. However, it is also contemplated that an automatic sprinkler system may be used to move the sump water through the sprinkler stations. The sprinkler stations 22 may be programmable and are controlled by the sump sprinkler control system 20. This may save hundreds of dollars per year over the cost of using the city water system and paying water and sewer costs for irrigation use. The sump sprinkler control system 20 may also have a custom programmable user interface 24 that is easy to use by any homeowner or business owner if the water tables are high enough to provide a water supply volume that is sufficient to fulfill the irrigation needs for an entire spring, summer and fall watering season to the residential or commercial lawn and landscape setting.

In one embodiment contemplated the sump sprinkler control system 20 may control the sump drainage systems high volume sump pump 26, a high pressure medium volume sprinkler pump 28 and an air compressor 30 which is optional to use in the sump sprinkler control system 20 according to the present invention. The optional air compressor 30 may be used to blow out the sprinkler lines of the system 20. The sump sprinkler control system 20 may have the capability of monitoring high level, irrigation level and low water levels via sensors 32 located in the sump of the building. The use of the at least three sensors 32 as described in the current embodiment may allow the system to monitor and accumulate water volume in the home or business foundation drainage system for future short term irrigation use. It also allows for the system 20 to control a sprinkler pump 28 and up to twenty or more sprinkler solenoid valve stations 22 to irrigate the property, based on a user entered program. This system 20 may also be used as a backup sump system should the sump pump 26 fail from mechanical or other reasons. Also, the system sensors 32 may be used to control the sump pump 26 to exhaust water to the property drainage system when not being accumulated for irrigation purposes within the sump sprinkler controller system 20. Furthermore, the system may also be used to control an air compressor 30 to automatically blow out the sprinkler stations 22 connected to the sump sprinkler control system 20 and the high pressure medium volume sprinkler pump 28 in an automatic manner.

The sump sprinkler control system 20 generally includes a sump sprinkler apparatus and the associated control algorithms necessary to operate the sump sprinkler stations 22. The sump sprinkler control system 20 includes an automatic sump pump 26 which is arranged within a sump of the property to which the sump sprinkler control system 20 is arranged. The sump pump 26 generally can be any type of commercially available sump pump that includes an outlet pipe, an inlet and a float which operates the sump pump 26 in an automatic manner. The sump pump 26 maybe of the submersible variety and sits at the bottom of the sump in the building to which the sprinkler system 20 is connected. The sump pump 26 is electronically connected to the system controller 34 of the sump sprinkler control system 20 according to the present invention. The system controller 34 is connected to the electrical system of the building into which the sump sprinkler control system 20 is arranged. Arranged within the same sump as the sump pump 26 is the inlet tube or pipe 36 of a sprinkler pump 28 according to the present invention. The sprinkler pump 28 may be any known sprinkler pump available commercially. In one contemplated embodiment the sprinkler pump 28 may have the following specifications—120VAC, 60 Hz with a current draw of 14.8 amps max and a horsepower of approximately one. It should be noted that the sump pump 26 may be any commercially available sump pump as described above, but may have the following specifications 120VAC, 60 Hz single phase with a current draw of approximately 9.5 amps and a horsepower of approximately 1/3. However, any other known sprinkler pump or sump pump having any known system specifications may be used in the present invention. The sprinkler pump 28 may be arranged adjacent to the sump within the interior or exterior of the building to which the sump sprinkler control system 20 is used. The sprinkler pump 28 may be either secured to a floor or a wall or in a separate room from that of the system controller 34. The output pipe of the sump pump 26 may have any known diameter and length depending on the environment in which the sump sprinkler control system 20 will be used. Generally, the piping is made of a plastic, however any other known metal, ceramic, composite or natural material may be used for the piping of the outlet and inlet sources for the sprinkler pump 28 and the outlet for the sump pump 26. The sprinkler pump 28 is also electronically connected to the system controller 34 of the sump sprinkler control system 20. The inlet tube 36 of the sprinkler pump 28 may have any known shape or diameter, in one contemplated embodiment, as shown in FIG. 1, it has a generally L-shape when viewed from the side. The inlet end may have any known shape on the inlet pipe 36, such as an angled cone shape as shown in FIG. 1, however any other shape may also be used but must include a backflow prevention valve in the inlet pipe 36 to the sprinkler pump 28. The sump sprinkler control system 20 also may include a water level device 38. The water level device 38 in one contemplated embodiment may be connected to the inlet tube 36 of the sprinkler pump 28. However, it should also be noted that the water level device 38 may be connected to any other component adjacent to or near the sump including but not limited to the floor adjacent to the sump, the walls of the sump or the wall of a surrounding structure over the sump. The water level device 38 generally includes a bracket 40 that is connected to the inlet pipe 36 of the sprinkler pump 28, wherein the device 38 extends into the sump and the water of the sump. Generally, in one contemplated embodiment of the present invention the water level device 38 may have three level sensors 32 arranged on the main body of the water level device 38. However, it should be noted that any number of water level sensors 32 may be used for the present invention, from as few as one to many multiple water level sensors 32 depending on the complexity needed for the sump sprinkler control system 20. In the embodiment shown any known fastener connects the water level device 38 to the bracket 40 which is connected to the inlet tube 36. The water level sensors 32 are in electronic communication with the system controller 34. The water level sensors 32 of the present invention generally include a low water level sensor, which is arranged at or near the lower end of the level device 38. An irrigation water level sensor which is arranged above the low water level sensor and below a high water level sensor which is arranged at or near the opposite end of the sensor from that of the low water level sensor. These three sensors 32, as shown in the contemplated embodiment of the sump sprinkler control system 20, are arranged at predetermined levels and will shut off the sprinkler pump for a low water level to maintain pump prime. The irrigation water level will communicate to the system 34 that the water level is acceptable for irrigation of the surrounding grounds. A high water level sensor will be used to notify the user of water reaching the max fill point of the sump. In one contemplated embodiment these water level sensors may be GEMS sensors LS-300 engineered plastic triple point float reed switches, which are rated at 10VA, however any other known liquid level switches or sensors may be used, other than those described above.

The sump sprinkler control system 20 also may include a pressure sensor 42 that is electronically connected to the system controller 34. Generally, the pressure sensor 42 may be secured to an outer surface of the sprinkler pump 28 and arranged such that the sensor 42 may monitor the pressure of the water flowing through the sprinkler pump 28. In one contemplated embodiment the water pressure sensor 42 may be a glow shift gages GS-S01 oil pressure sender that is generally rated between 0-10 bars. However, any other water pressure sensor 42 may be used and may be arranged at different locations than that of being arranged on the cover of the sprinkler pump 28, such as anywhere on the outlet pipe of the sprinkler pump 28. The sump sprinkler control system 20 may also include a plurality of sprinkler stations 22 connected to one end of the outlet pipe or tubing 44 of the sprinkler pump 28. The opposite end of the outlet tube 44 is connected to the outlet port of the sprinkler pump 28. Generally, the sprinkler valves 22 may be arranged at various positions around the building such that they cover the entire width and length of the lot on which the building is located. This may allow for full sprinkler and irrigation coverage of the surrounding landscape and grass around the building to which the sump sprinkler control system 20 is arranged. The sprinkler valves 22 may be any of the known sprinkler valves that are commercially available. In one contemplated embodiment the sump sprinkler control system 20 may have a total of six sprinkler stations 22 arranged around the land of the building. However, it should be noted that any other number of sprinkler stations 22 from one up to twenty may also be used in the sump sprinkler control system 20 according to the present invention. In one contemplated embodiment the sprinkler valves 22 have the following specifications—24VAC, 19VAC Min., 60 Hz. They have an inrush current draw of 0.2 amps max at 24VAC and a holding current draw of 0.19 amps max at 24VAC. It should be noted that any known sprinkler valves or quick connect systems can be used with the present invention. It should further be noted that each of the sprinkler stations 22 may be electronically connected to the system controller 34 via any known wired or wireless system. Each of the electrical connections described herein are generally made via wired connections, however wireless systems are also contemplated and may be used in the sump sprinkler control system 20 according to the present invention. The outlet tube 44 of the sprinkler pump 28 according to the present invention also may include a backflow prevention valve 46 therein. In one contemplated embodiment a first backflow prevention valve 46 may be arranged in the outlet tube 44 a predetermined distance from the outlet opening of the sprinkler pump 28. It is also contemplated to use a second backflow prevention valve 46 at an offshoot connector of the outlet tube 46. The use of these backflow prevention valves 46 may prevent water from flowing from the sprinkler pump 28 into the air compressor 30 and pressurized air from the air compressor 30 flowing back through the sprinkler pump 28 causing it to lose prime, as described hereafter. Any known backflow prevention valve may be used within the outlet tube 44 of the present invention.

The present invention of the sump sprinkler control system 20 may also include an air compressor 30, which is electronically connected to the system controller 34 and pneumatically connected to an input valve which is in communication with the output tube 44 of the sprinkler pump 28. In one contemplated embodiment the air compressor 30 may have the following specifications—120VAC, 60 Hz single phase compressor with a 15.5 A. Max current draw and having approximately two horsepower. However, any other size air compressor 30 may be used depending on the design requirements for the sump sprinkler control system 20 according to the present invention. The air compressor 30 may be controlled by the system controller 34 and may be used to blow out the sprinkler stations 22 of the sump sprinkler control system 20. These blowouts may be scheduled to occur at the end of each cycle to keep standing mineral content from building up in the sprinkler lines and heads if the ground water has a high mineral content or may be scheduled yearly at the end of season to ensure no freezing of the lines and cracking of the lines or sprinkler stations during winter months. The air compressor 30 may be arranged on a floor or a wall adjacent to the sump and system controller 34 depending on the design requirements and environment in which the sump sprinkler control system 20 may be used. It should be noted that all of the piping described herein may be made of a plastic material, however any other metal, ceramic, composite, or natural material may be used for any of the piping described or disclosed herein. As stated above, generally the air compressor 30 is electrically connected to the system controller 34 via a wire. Any known type of high pressure tubing may also be used to connect the air compressor output to the inlet valve connected to the outlet tube 44 of the sprinkler pump 28. As noted above, all of the components of the sump sprinkler apparatus may be connected inside a building to which the sprinkler system is connected or may be located in a separate building on the land adjacent to the building to which the land being irrigated is attached.

In another contemplated embodiment of the present invention the sump sprinkler control system 20 may be connected to buildings on properties that may only have approximately 70 to 80% of the capacity required for irrigation of the land surrounding the building. This 70 to 80% capacity generally may be in the foundation drainage system of the building. In the case of the 70 to 80% capacity of buildings and surrounding areas, an additional valve may be controlled and included in the system 20 in order to add water to the sump as required from the properties city water supply to make up for any shortage of water that naturally occurs in the foundation drainage system that ends up in the sump of the building. It should be noted that it is also contemplated to use such additional valve to add water to the sump in any known foundation drainage system percentage other than that of the 70 to 80% example as described above.

The sump sprinkler control system 20 generally uses and includes one system controller 34 having one operator interface unit 24. The operator interface unit 24 may consist of an integrated display and keypad, outputs for a plurality of solenoid control valves of the sprinklers 22, an alarm device 48, inputs for at least three water level switches or sensors 32 and a sprinkler pump water pressure sensor 42. It should be noted that the water pressure sensor 42 may be used for determining high and low water pressure conditions in order to trigger a system wide shutdown to protect the sprinkler pump 28 from damage. The operator interface unit 24 may also have at least three 110VAC receptacles, which may be internally fed through a fifteen amp circuit breaker to provide system controlled power sources to the sump pump 26, the sprinkler pump 28 and optional air compressor 30 if desired. It should be noted that the operator interface unit 24 may have any number of AC 110 receptacles, not just the three as mentioned above, but may have as few as one and as many as eight. In one contemplated embodiment, the sump sprinkler control system 20 may be designed to operate off a single standard 110 VAC, 15A household receptacle, with a maximum current draw with only one high current output at a time of approximately 13 amps. However, the maximum current draw of any compressor or pump may be approximately 12 amps. The system controller 34, may have integrated mounting provisions arranged thereon. These may include, but are not limited to, orifices through which screws may be arranged, orifices which may be hooked or arranged over a screw that is already secured in a deck, wood wall, cement wall, or other mounting surface adjacent to the sump. However, it should be noted that the system controller 20 may also be arranged at a distance from the sump if operated in a wireless manner or it may be wired to an opposite side of the building or to a completely different building away from the sump if need be. Generally, the system controller 34 should be mountable with approximately one to eight screws or fasteners to a deck, a wood wall, cement wall, or any other surface. Furthermore, the sump sprinkler control system 20 may be designed to operate indoors or outdoors, wherein the expected ambient operating temperature range of the system may be anywhere from 50° to 110° F. It is also contemplated that the sump sprinkler control system 20 be designed to have a minimum ten year service life, however that may increase or decrease depending on the design requirements and environment in which the sump sprinkler control system 20 is used. Any known cabinet, box or structure may be used to house the electronics of the system controller 34. In one contemplated embodiment a metal box is used, however any other ceramic, composite, plastic, or natural material may be used to form the unit. In one contemplated embodiment, the user interface 24 may be a Rabbit OP6800 or OP6810 with or without a Ethernet connector controller with integrated display and keypad. However, any other known integrated display and keypad controller may also be used, the one described above is just one used in the contemplated embodiment. The user interface 24 is programmable and capable of having a minimum of eight programmable user selected modes that may be used in accordance and with the sump sprinkler control system 20 according to the present invention.

The Figures also show a mechanization diagram of the sump sprinkler control system 20 according to the present invention. This diagram shows all of the connections between the keypad 24, and all of the sprinkler stations 22 and associated hardware, which is part of the sump sprinkler control system. The schematic also identifies the necessary circuitry needed to create the sump sprinkler control system 20 according to the present invention. It should be noted that this is just one of many mechanization diagrams and schematics that may be used and any other programmable system may also be used that allows for the connection of all of the components of the sump sprinkler control system 20 and control thereof according to the present invention. Therefore, many other designs of the electrical circuitry may also be used in conjunction with this design other than those shown in the drawings.

A methodology in the form of software and associated algorithms may be used to control the sump sprinkler control system 20. The sump sprinkler control system 20 methodology generally controls and monitors the sprinkler stations 22, an alarm 48, a high water level 50, an irrigation water level 52, the low water level 54, a sprinkler pump 28, a sump pump 26, a sprinkler pump water pressure 56, and optional air compressor 30 if used in the system, and may also be connected to and monitor a real time clock 58 in the operator interface unit 24 where the operator of the sump sprinkler control system 20 sets modes and enters parameters for the system. Generally, in one contemplated embodiment a high level system model of the methodology for the sump sprinkler control system 20 includes four basic subsystems. The first is the selection of modes and entry of base user parameters 60 for the system. The second is the scheduled watering cycle 62 and operation thereof. The third is the fault detection 64 for the sprinkler control system while the fourth is the fill time learning algorithm 66, which will teach the system the most efficient way to use the water thereof.

The first subsystem of the methodology for the sump sprinkler control system 20 is the select mode and enter base user parameters subsystem 60. Generally, in box 72 on power up, the sump sprinkler control system 20 shall turn on the sump pump outlet and display the system name "sump sprinkler control system". Then in box 74, the methodology will determine if a button has been pressed. If a button has been pressed the system will enter box 76 and display the first of three modes in which the user can select. These displays may include set date and time, display date and time, cycle settings, cycle manual start, cycle manual stop, blow out start, blow out stop and cycle status. The methodology would then enter box 78 and determine if the set date and time mode is selected. If that mode is selected then the methodology will enter box 80 and allow the operator to set the year, month, date, and time of day in 24 hour mode. Next, the methodology enters box 82 and the user chooses to display the day, month, date, year and time on the display of the system controller and then returns to block 76. The methodology in box 84 determines if the display date and time mode was selected and if this mode was selected enters box 86 and displays the date, month, year and time and then returns to block 76. Next, the methodology in box 88 determines if the cycle settings mode was selected. If the cycle settings mode is selected, the methodology enters block 104. If it is not selected, the methodology enters block 90 and determines if the cycle manual start is selected or is a manual cycle in progress. If the manual cycle is in progress, the methodology enters block 186. If the manual cycle start mode is not selected or a manual cycle is not in progress, the methodology enters block 92. In block 92 the methodology will determine if the cycle manual stop has been selected, if it has been selected, the methodology will turn off the stations, turn off the sprinkler pump and turn on the sump pump. Next, the methodology would enter block 106. If the cycle manual stop mode was not selected, the methodology would enter block 96 and determine if the blow out start mode is selected or is a blow out in progress. If the blow out mode was selected or is in progress the methodology enters block 168. If the blow out start mode was not selected and there is not a blow out in progress, the methodology enters block 98. In block 98 the methodology determines if a blow out stop mode has been selected. If the blow out stop mode has been selected, the methodology enters block 230. If the blow out stop mode was not selected, then the methodology enters block 100 and determines if the cycle status mode was selected. If that mode was selected, the methodology enters block 102 and a display would show water scheduled active/inactive, the day, date, month, year and time, press key to exit or the cycle status of manual or scheduled aborts. The methodology would then continue on to block 106. If the cycle status mode was not selected, the methodology would continue on to block 106.

In box 104 the methodology displays the following choices: stations, schedule, sump fill estimate, blow out settings, and an exit menu selection. The methodology then enters block 106 and determines if the stations mode was selected. If it was selected, the methodology enters block 108 and allows the user to increase or decrease station watering time in minutes and then enter the result for each station of the sprinkler system thereafter. The methodology then returns to block 104. If the station mode was not selected, the methodology enters block 110 and determines if the schedule mode was selected. If the schedule mode was selected, the methodology enters block 112 where the user can enter the start time, hours and minutes in 24 hour mode and select the days to water. The methodology then enters block 114 which allows the user to activate the schedule by selecting yes or no. Next, the methodology enters block 116 where it is determined by the methodology if a scheduled watering cycle is activated. If no cycle is activated, the methodology returns to block 104. If a scheduled watering cycle is activated, the methodology enters block 128. If the scheduled mode is not selected, the methodology enters block 118 and determines if a sump fill estimate mode has been selected. If the button has been selected, the methodology enters block 120 where the methodology sets the first value after power up as a default (8 hours in one embodiment), otherwise the fill time is calculated by a learning algorithm, and it displays the current fill time and requires a presskey to exit. The methodology then returns to block 104. If the sump fill estimate block mode is not selected, the methodology enters block 122 and it is determined if the blow out settings mode has been selected. If that mode was selected, the methodology enters block 124 and determines the input tank pressure time and blowout time. Next, the user would choose to blow out after every cycle and then continue on into block 104. If the blow out settings mode was not chosen, then the methodology enters block 126 and determines if the exit menu mode was selected, and if it was selected the methodology enters block 76. If it was not selected, the methodology enters block 128.

The methodology in block 186 sets the sump pump to the off position. The methodology then enters block 188 to determine if the water is above the low sensor level. If the water is above the low level sensor, the methodology enters block 190 where it is determined if cycle station 1 is activated and has not completed watering this cycle. If station 1 is active and not completed the cycle the methodology enters block 204 to record the time the station started to water, turn on station and turn on the sprinkler pump 28. If station 1 has completed the methodology then enters blocks 192-200 for station 2, station 3, station 4, station 5, and station 6 until all of the stations have completed the watering cycle. After completion of all watering cycles, the methodology enters block 78. After block 204, the methodology enters block 206 to determine if the low sensor is on or off. If the low sensor is off, the methodology enters block 208 to determine if cycle 1 station X watering time has elapsed. If it has elapsed, the methodology enters block 210 to turn off the sprinkler pump, turn off the station and wait five seconds. If the duration has not elapsed, the methodology will enter block 78. If the low level sensor is not off, the methodology enters block 224 and turns off the sprinkler pump, turns off the station, and calculates station watering time remaining. The methodology then enters block 226 and determines if the water level has reached the irrigation sensor. If the water level has not reached the irrigation sensor, the methodology will enter block 78. If the water level has reached the irrigation sensor, the methodology enters block 228 and records the time the station started to water, turns on the station, turns on the sprinkler pump, and continues the timer for an amount of time station is watering. The methodology then enters block 208 to determine if the cycle of that station duration has elapsed. After exiting block 210, the methodology enters block 212 to determine if cycle 1 blow out set equals one. If it does equal one, it turns on the air compressor, waits for the cycle tank pressure time, turns on the sprinkler station, waits for cycle 1 blow out time, turns off the sprinkler station and turns off the air compressor. The methodology then enters block 216 and determines if the code just executed was for station 6. If it was executed for station 6, the methodology sets the sump pump to on in block 218 and then enters block 220 to determine if the scheduling watering cycle is enabled. If it is enabled, the methodology enters block 128, if it is not enabled it enters block 78. If the code just executed is not for station 6, the methodology enters block 222 and increments by one and evaluates the next watering station.

The methodology enters block 168 and determines if a blow out cycle is in progress. If it is in progress, the methodology enters block 172 and determines if the tank pressurize time has expired. If the blow out cycle is not in progress, the methodology enters block 170, and turns off the sprinkler pump, turns off the sump pump and turns on the air compressor. The methodology then enters block 172 and determines if the tank pressurize time has expired. If the tank pressurize time has not expired, the methodology enters block 78. If the tank pressurize time has expired, the methodology enters block 174 and turns on station n. The methodology then enters block 176 and determines if the blow out time has expired. If the blow out time has expired, the methodology enters block 178 and turns off the station n and sets n=n+1 and resets the tank pressurize time. Then the methodology enters block 180 to determine if all of the stations have been blown out. If the blow out time has not expired, the methodology enters block 78. If all of the stations have been blown out, the methodology enters block 182 and resets the blow out cycle in progress and then enters block 184 to turn on the sump pump. Next, the methodology enters block 78. If all of the stations have been blown out, the methodology enters block 78.

The methodology in the blow out stop cycle enters block 230 and turns off the air compressor. Next, the methodology enters block 232 and turns off station 1. Next, the methodology enters block 234 and turns off station 2. Then the methodology enters block 234 and turns off station 2. Station 3 is subsequently turned off in block 236. Next, the methodology enters block 238 and turns off station 4. The methodology then enters block 240 and turns off station 5. The methodology will then enter block 242 and turns off station 6. The methodology then enters block 244 and turns on the sump pump. The methodology then enters block 246 and determines if the scheduled watering cycle has been enabled. If it has been enabled, it will enter block 128, if it has not been enabled it will enter 78.

The methodology in the scheduled watering cycle and fill time learning algorithm enters block 128 and determines if the current watering cycle has been suspended and has the partial fill time expired. If the watering cycle is suspended and the fill time has expired, the methodology enters block 154 and records the time the station started to water, turns on the station and sprinkler and continues the timer for an amount of time the station is watering. Then the methodology in block 156 determines if cycle 1 of station x duration has elapsed. If the current watering cycle has not suspended and the partial fill time has not expired, the methodology enters block 130 and determines if the cycle is enabled and within the fill time or partial fill time window. If this does not occur, the methodology enters block 78 and if it has occurred, the methodology enters block 132 and sets the sump pump parameter to off. Next, the methodology enters block 134 to determine if the high sensor is on or if a start time is achieved and irrigation level is on. If these are both affirmative, the methodology enters block 136 to determine if cycle 1 station 1 duration is greater than zero and has not completed watering cycle. If the high level sensor is off or the start time has not been achieved or the irrigation level is off, the methodology enters block 78. After the methodology enters block 136 and 144-152 to determine for each station if the watering duration is greater than zero and if the water cycle has not been completed, the methodology enters block 138 for each affirmative block and records the time the station started to water, turns on the station and turns on the sprinkler pump. The methodology in block 140 then determines if the low level sensor is on. If it is on, the methodology turns off the sprinkler pump, turns off the station, calculates the station watering time remaining in block 142 and then enters block 248. If the low sensor is not on, the methodology enters block 156 and determines if the cycle 1, station x duration has elapsed. If it has elapsed, the methodology enters block 158 and turns off the sprinkler pump, turns off the station and then waits a predetermined amount of time. The methodology then enters block 160 and determines if the code just executed was for station 6. If it was not executed for station 6, the methodology enters block 164 and increments by one and then evaluates the next station. If the code just executed was for station 6 the methodology enters block 162 and determines if the cycle one blow out is set. If it is set the methodology enters block 168 and if it is not set, the methodology enters block 166 to set the sump pump to on and then enters block 248.

The fill time learning algorithm of the methodology starts in block 248 and determines if a partial fill time needs to be calculated in order to complete a watering cycle. If this does have to occur, the methodology enters block 250 and calculates the fill time for the remaining station watering time by dividing the actual fill time by the watering time thus far to obtain the fill time ratio. The methodology then enters block 252 and multiplies the fill time ratio by the total watering time remaining plus one hour to obtain the partial fill time to complete watering cycle. The methodology then enters block 78. If block 248 has not occurred, the methodology enters block 254 and determines if the cycle started early due to high sensor being on. If this did not occur, the methodology enters block 260 and calculates the cycle 1 beginning fill time plus any extra fill time required due to inadequate water during any station watering time, plus one hour. The methodology then enters block 258 to calculate the cycle 1 fill T ratio, which is the cycle 1 fill time divided by the total watering time for all stations. The methodology then enters block 78. If the cycle did start early due to high sensor being on, then the methodology enters block 256 calculates cycle one fill time as the beginning fill time plus any extra fill time required due to inadequate water during any station watering time minus one hour, then enters block 258 to calculate the cycle 1 fill time ratio by dividing the cycle 1 fill time by the total watering time for all stations. It should be noted that the total of watering time of all stations will be multiplied by this ratio to derive the next fill time.

The methodology in block 262 determines if the high level water is achieved. If it has been achieved, the methodology enters block 264 and determines if a scheduled watering cycle is enabled. If it is enabled, the methodology enters block 268. If the watering cycling is not enabled, the methodology enters block 266 and displays sump pump failed, enables manual watering cycle, sounds the alarm, and display the reason for the alarm. The methodology then enters block 186. In block 268 the methodology determines if the high water level has been active for longer than one hour, if it has the methodology enters block 272 and turns on the sump pump, sounds the alarm and displays a reason. If it has not, the methodology then enters block 128. If the high water level is not achieved the methodology enters block 274 and determines if a watering cycle currently is in progress. If it is not in progress, the methodology enters block 78. If a watering cycle currently is in progress, the methodology enters block 276 and determines if the water pressure is too low indicating loss of prime or break in supply line. If the water pressure is too low, the methodology enters block 278 and increments low pressure diagnostic fail counter, then the methodology enters block 280 and determines if the low pressure existed for four out of five minutes. If it has not existed for four out of five minutes, the methodology enters block 78. If the methodology determines that the low pressure has existed for four to five minutes, the methodology enters block 282 and turns off the sprinkler pump, sounds the alarm and displays the reason for the alarm. If the water pressure is not too low, the methodology enters block 284 and determines if the water pressure is too high indicating that the valve is stuck closed or other blockage has occurred. If this has not occurred, the methodology enters block 78. If this has occurred, the methodology enters block 286 and increments the high pressure diagnostic fail counter then enters block 288 and determines if a high pressure existed for 25 out of 30 seconds. If the high pressure did not exist for 25 out of 30 seconds the methodology enters block 78 and if it has the methodology enters block 290 and turns off the sprinkler pump, sounds the alarm and displays the reason for the alarm.

The methodology that controls the sump sprinkler control systems according to the present invention upon power up may turn on the sump pump outlet and display the system as the sump sprinkler control system. These methodologies are all shown in the program flow charts shown in the Figures. If after power on, if any button is pressed on the front panel keypad, the display will show the first three of the following modes from which the user can select, these are set date and time, display date and time, cycle settings, cycle manual start, cycle manual stop, blow out start, blow out stop and cycle status. It should be noted that the remainder of the modes shall be accessed by scrolling them onto the display using the up and down arrow keys on the front panel keypad. The user may select the mode by highlighting the mode using the up and down arrow keys and then pressing the enter button on the keypad 24.

If the set date and time button was selected, the sump sprinkler control system 20 will initially prompt the user to select the four digit year by using the up and down arrow keys on the front of the panel keypad to advance or reduce the year. It should be noted that the default is set to 2012. Once the desired year has been achieved, the system 20 will save it and move to the month entry screen after the enter button has been pressed. Next, the user will be asked to enter the month screen, which is initially displayed as 01 and increment or decrement by using the up and down arrow keys to reach the desired month. Once that month has been reached, it shall be selected and saved by pressing the enter button. Next, the user will be prompted to enter the day of the month, where that month shall initially display one while incrementing and decrementing by use of the up and down arrow keys to achieve the desired day. Once that day has been achieved, it will be selected and saved by pressing the enter button. Then the user will be prompted to enter the time of day in 24 hour mode. Initially the time of day will display 00 and prompt for the other to be entered by either incrementing or decrementing using the up and down arrow keys to achieve the desired hour. Once that hour has been reached, it may be selected and saved by pressing the enter button at which time the user will be prompted to enter the minute. The minute screen shall initially display 00 and then prompt for the minute to be entered by either incrementing or decrementing the up and down arrow keys to achieve the desired minute. Once that minute has been reached, it shall be selected and saved by pressing the enter button at which time the system shall display the date, time, hours, minutes and seconds. Next, the methodology will continue by pressing any key and shall return the system to the main screen menu.

After the display date and time mode has been selected from the original screen, the sump sprinkler control system 20 will display the date and time only. It should be noted that while pressing any key while in this mode shall return the system to the first level menu.

If the cycle settings mode is selected from the main screen, the sump sprinkler control system 20 shall go to a second level menu with selections identified as stations, schedule, sump fill estimate, blowout settings and exit menu. The sump sprinkler control system shall then display the first of the three modes which the user can select. The remainder of the modes shall be accessed by scrolling them onto the display using the up and down arrow keys on the front panel keypad 24. In order to select a mode from the cycle settings the user shall highlight the mode and use the up and down arrow keys and press the enter button. If the stations mode is entered, the up and down arrow keys may be used to increase or decrease the watering time for the stations beginning at station 1. When the desired time is achieved for that station, pressing the enter button shall save the current displayed time and move on to the next station. An entered value of zero for any station generally means that the station will not water during a manual or automatic watering cycle. It should also be noted that once the desired watering time has been entered for all stations, and the enter button is pressed again, the system shall return to the second level menu. If the schedule mode is selected in the second level menu, the start time shall be entered by the user and then saved by pressing the enter button. Next, the watering days will be set by toggling between yes and no for each day of the week and the appropriate decision will be saved by pressing the enter button. Once all decisions have been entered regarding the schedule and saved for all of the days, the system will ask if the schedule should be activated and toggle between yes and no by using the up and down arrow keys. Once a desired selection is chosen and saved by pressing the enter button the system then will return to the level two menu. If the sump fill estimate button is selected, the sump sprinkler control system 20 would display the currently saved sump fill estimate in hours. Upon power up and prior to execution of the initial watering cycle, this value will be set to a default reading. This default reading is predetermined to be eight hours, but may be any value. Once the system has executed the watering cycle and determined a learned fill time, it will save the fill time and return the system to the level menu. If the blow out settings mode was entered, the user will be asked to input the tank pressurize time, in minutes, by pressing the up and down arrow keys to increase or decrease the value. Once that value has been found they will press the enter key to save the time and move to the next parameter screen to input the blow out time. The blow out time will be input in minutes by using the arrow keys to increase or decrease the value. Once a desirable time is reached, the enter key will be pressed saving the time. The methodology will then ask if the blow out shall occur on every cycle. The user will then toggle between yes and no with the arrow keys to the desired decision and press the enter button to save such decision into the system and return to the second level menu. If the exit menu is selected, the sump sprinkler control system 20 will return to the main menu.

If from the main menu the cycle manual start button is selected, the sump sprinkler control system 20 will disable the sump pump and check if the water level is above the low water level. If the water is not above the low water level, the system shall wait for the water to be above the low sensor level before beginning the manual watering cycle. If the water level is sufficient the system will look for the first station with a programmed watering time greater than zero that has not completed watering this cycle. The sump sprinkler control system 20 will then turn on the first available station, record the time the station starts to water and turn on the sprinkler pump 28. The station shall continue watering until the programmed watering time is reached or the low water level is indicated. If the low water level is indicated the sump sprinkler control system 20 will turn off the sprinkler pump 28, turn off the station 22 and calculate the station watering time remaining. If the watering time is reached, the sump sprinkler control system 20 shall turn off the sprinkler pump 28 and turn off the station 22. Next, the methodology will determine if the cycle blow out is enabled, the system then will turn on the air compressor 30 for the time it takes to pressurize the tank and then turn the sprinkling station back on and wait for a cycle blow out time to elapse before turning off the sprinkler station and air compressor 30. The sump sprinkler control system 20 shall then increment to the next station programmed, water and repeat these steps. The methodology if the cycle blow out is not enabled will then be incremented to the next station programmed, water and repeat the steps of this level.

If from the main menu the cycle manual stop mode is selected, the sump sprinkler control system 20 shall turn off all of the watering stations, turn off the sprinkler pump 28 and turn on the sump pump 26. The methodology shall then reset all of the interim sprinkler system times such that a full watering cycle with the programmed times for each of the stations will be executed for the next manual or automatic watering cycle.

If, from the main menu the blow out start methodology is chosen, the sump sprinkler control system 20 shall turn off the sprinkler pump 28, turn off the sump pump 26, and turn on the air compressor 30. When the air compressor 30 has been on for the tank pressurized time entered into the system, then the system shall turn on station one and leave it on for the blow out time entered prior in the system. When the blow out time has expired, the sump sprinkler control system 20 shall turn off station one and again let the air compressor tank pressurize for the entered pressurized time. When the tank pressurized time has again been reached, the system will then turn on station 2 and leave it on for the entire blow out time before turning the station off to again to let the system pressurize. It should be noted that the process of pressurizing, turning on the next station, blowing out and turning off the station shall be completed for all of the stations. After all of the stations have been completed through the blow out cycle, the sump sprinkler control system 20 shall reset the blow out cycle and turn the sump pump on.

If on the main menu the blow out stop mode is selected the sump sprinkler control system 20 shall turn off the air compressor 30 and turn off all of the stations and then turn on the sump pump 26. The sump sprinkler control system 20 shall immediately check to see if a scheduled water cycle is enabled or within a fill time or partial fill time window. If these occur, then the system shall shut the sump pump to off.

If in the methodology the cycle status mode is selected from the main menu, the sump sprinkler control system 20 will display the status of the water schedule being set to either on or off along with the day, date and time. If any key is pressed the system shall return to the level one menu.

If a scheduled watering cycle is enabled within a fill time or partial fill time window then the sump pump will be turned off. If the high water sensor is on or the program start time is achieved and the irrigation level sensor is on, then the system shall look for the first station with a programmed watering time greater than zero that has not completed watering in this cycle. The sump sprinkler control system 20 shall then turn on that station, record the time the station starts to water and turn on the sprinkler pump 28. This station shall then continue watering until the program watering time is reached or the low water level sensor is activated and indicated to be on. If low water is indicated the sump sprinkler control system 20 will turn off the sprinkler pump, turn off the station and calculate the station watering time remaining. If the end of the watering time is reached, the sump sprinkler control system 20 will then turn off the sprinkler pump 28 and turn off the station. The sump sprinkler control system 20 may then increment to the next station, programmed, water and repeat these steps until all programmed stations have completed watering. Next, if the cycle blow out mode is enabled, the sump sprinkler control system 20 shall turn on the air compressor 30 for the time it takes to pressurize the tank, then turn the sprinkler 22 station 1 on and wait for the cycle blow out time to elapse. This cycle shall then be repeated for stations 2 through 6. Then, the methodology will turn off the last sprinkler station 22 and the air compressor 30. If all stations have completed watering in the cycle and blow out mode is not enabled, or if blow out mode is enabled and has completed, the sump sprinkler control system 20 will turn the sump pump 26 on and execute the fill time learning algorithm as defined herein.

In the fault detection self system of the methodology the methodology will determine if the high water level sensor indicated that high water level has been met. The sump sprinkler control system 20 will then check to see if a scheduled watering cycle is enabled. If such a scheduling water cycle is enabled it will start the watering cycle early. Next the methodology will determine if a scheduled watering cycle is not enabled. If it is determined that a scheduled watering cycle is not enabled by the methodology, the sump sprinkler control system 20 will turn on the sump pump 26, sound the alarm 48, and display high sump water level on the front panel display of the controller 31. The fault detection methodology then will determine if a watering cycle is currently in progress and if the sprinkler pump 28 is enabled. The sump sprinkler control system 20 will continuously check for low water pressure conditions, which could indicate a loss of pump prime, or a break in a sprinkler water line or a seized sprinkler pump. If the methodology determines that a low pressure condition is occurring for four minutes out of a five minute period, the methodology will turn off the sprinkler pump 28. Then an alarm will be turned on by the methodology and a low sprinkler pump pressure message will be displayed on the front panel. It should be noted that the methodology will turn off the alarm after it has sounded for approximately ten minutes. It should be noted that this amount of time for the alarm can be changed from anywhere from a couple of seconds to many hours.

Next, in the fault detection subsystem of the methodology, the methodology determines if watering cycles are currently in progress and the sprinkler pump 28 is enabled. If these have occurred, the sump sprinkler control system 20 will continuously check for a high water pressure condition, which may indicate an obstruction of the sprinkler line or a stuck closed sprinkler valve. If the methodology determines that a high pressure condition is occurring for 25 out of a 30 second period, the sprinkler pump 28 then may be turned off and the alarm may be turned on and a high sprinkler pump pressure message is displayed on the front panel of the system controller 34. It should be noted that in this methodology the alarm may sound for ten minutes before it is turned off. It should be noted that these time ranges may vary from those described herein.

The methodology also runs a fill time learning algorithm whenever a programmed watering cycle is complete or where a partial watering cycle is suspended due to a low water event being indicated by the low water level sensor. The methodology for the fill time learning algorithm will determine if a programmed watering cycle was suspended due to low water. The sump sprinkler control system 20 then will calculate a fill time for the remaining station water times, based on the fill time of the current cycle and the watering time that was enabled by it. This occurs by dividing the current fill time by the time of the watering time thus completed. The methodology then takes the current programmed fill time and divides it by the watering time that has occurred to obtain the fill time ratio. This fill time ratio shall be multiplied by the total time remaining in the current watering cycle plus one hour to obtain the partial cycle fill time necessary to accumulate sufficient water to complete the current watering cycle. If a programmed water cycle was completed, but the cycle started early due to the high sensor being activated, the sump sprinkler control system 20 will determine the time it took to achieve the high water level from the time the sump pump 26 was turned off minus one hour and use the result and time as a current programmed fill time. This current programmed fill time shall then be divided by the total programmed watering time of all stations for the cycle just completed to obtain the fill time ratio. The methodology will then use this fill time ratio and multiply it by the total watering time of all stations to derive the next fill time for the next programmed watering cycle start. If a programmed watering cycle was completed the methodology will then determine the cycle started on time with the irrigation sensor activating and without the high water sensor activating prior to start. Next, the sump sprinkler control system 20 will utilize the currently programmed fill time plus any extra fill time required due to low water level being triggered. This fill time shall be divided by the total programmed time of all stations for the cycle just completed to obtain the fill time ratio. The fill time ratio then will be multiplied by the total watering time of all stations to derive the next fill time for the next programmed water cycle start. If the programmed watering cycle was completed, but the cycle started late due to the irrigation sensor not activating by the program start time, the methodology will determine the time it took to activate the irrigation sensor from the time the sump pump 26 was turned off. It will again take this time plus any extra fill time required due to low water level being triggered, add one hour to it and use the result in fill time as the current programmed fill time. The methodology will then take this current fill time and divide it by the total programmed watering time of all stations to obtain the fill time ratio. The methodology will use this fill time ratio by multiplying it by the total watering time of all stations to divide the next fill time for the next programmed watering cycle start. It should be noted that this description of the methodology and the four basic subsystem methodologies thereof is also shown in the accompanying and attached flow charts of the present application. It should be noted that all of the times mentioned in either the description or the Figures may be changed in either an increased or decreased direction depending on the environment in which the sump sprinkler control system 20 will be used.

It should be noted that the methodology described above is one of the methodologies used to operate and control the sump sprinkler control system 20 according to the present invention. Modifications and variations of these algorithms may be used and still fall under the scope of this application and associated sump sprinkler control system 20.

The present invention has been described in an illustrative manner. It is to be understood that the terminology which has been used is intended to be in a nature of words of description rather than that of limitation.

Many modifications and variations of the present invention are possible in light of the above teachings. Therefore, within the scope of the appended claims, the present invention may be practiced otherwise than as specifically described.

What is claimed is:

1. A sump sprinkler system, said system comprising:
a system controller;
a high pressure sprinkler pump in communication with said system controller;
an intake tube connected to said sprinkler pump, said intake tube having an end arranged in a sump of a building foundation drainage system;
a sump pump in communication with said system controller;
at least one sprinkler connected to an output of said sprinkler pump, said sprinkler in communication with said system controller; and
a water level member in communication with said system controller, said water level member is arranged in said sump.

2. The system of claim 1 further comprising an air compressor in communication with said system controller, said air compressor connected to said sprinkler.

3. The system of claim 2 further comprising a back flow prevention valve arranged between said sprinkler and said air compressor.

4. The system of claim 1 further comprising a back flow prevention valve arranged between said sprinkler and said sprinkler pump.

5. The system of claim 1 wherein said water level member is connected to said intake tube.

6. The system of claim 1 wherein said water level member having three sensors arranged at predetermined locations thereon.

7. The system of claim 1 further comprising a pressure sensor electrically connected to said system controller.

8. The system of claim 1 further comprising a bracket arranged between said water level member and said intake tube.

9. The system of claim 1 further comprising an outlet tube connected to said output of said sprinkler pump, said outlet tube connected to said sprinkler.

10. A method of controlling a sump sprinkler system used in conjunction with a sump of a building, said method comprising the steps of:
- setting modes and user parameters for the sump sprinkler system, said sump sprinkler system having a high pressure sprinkler pump and a sump pump;
- scheduling a watering cycle from water in the sump of the building foundation drainage system;
- operating said watering cycle through at least one sprinkler of the sump sprinkler system;
- detecting faults of the sump sprinkler system; and
- learning water use efficiency for the sump sprinkler system.

11. The method of claim 10 further comprising the step of determining if a manual water cycle has been started.

12. The method of claim 10 further comprising the step of determining if a manual or automatic blowout cycle is needed.

13. The method of claim 10 further comprising the step of calculating a fill time needed to complete said watering cycle.

14. The method of claim 10 further comprising the step of determining if a water level in the sump is above a low water level sensor.

15. The method of claim 10 further comprising the step of determining if a water level in the sump is equal to irrigation level sensor.

16. The method of claim 10 further comprising the step of blowing out said sprinkler with a compressor.

17. The method of claim 10 further comprising the step of determining if a water level in the sump is at a high water level sensor.

18. The method of claim 17 further comprising the step of turning on said sump pump if high water level sensor has been active greater than a predetermined amount of time.

19. The method of claim 10 further comprising the step of determining if a water pressure is lower than a predetermined value.

20. The method of claim 10 further comprising the step of determining if a water pressure is higher than a predetermined value.

21. The method of claim 10 further comprising the step of calculating a fill time needed to allow watering through all sprinklers of the sump sprinkler system.

* * * * *